United States Patent
Satoh et al.

[19]

[11] Patent Number: 5,811,695
[45] Date of Patent: Sep. 22, 1998

[54] TORQUE SENSOR

[75] Inventors: Kouichi Satoh; Toshiyuki Onizuka; Kazuho Chikaraishi, all of Gunma, Japan

[73] Assignee: NSK Ltd., Tokyo, Japan

[21] Appl. No.: 892,971

[22] Filed: Jul. 15, 1997

[30] Foreign Application Priority Data

Jul. 22, 1996 [JP] Japan .................................. 8-209401

[51] Int. Cl.$^6$ ...................................................... G01L 3/10
[52] U.S. Cl. ...................................................... 73/862.331
[58] Field of Search ...................... 73/862.326, 862.328, 73/862.331, 862.332

[56] References Cited

U.S. PATENT DOCUMENTS

| | | | |
|---|---|---|---|
| 4,805,463 | 2/1989 | Kelledes et al. | 73/862.331 |
| 5,578,767 | 11/1996 | Chikaraishi et al. | 73/862.331 |
| 5,641,916 | 6/1997 | Satoh et al. | 73/862.331 |

FOREIGN PATENT DOCUMENTS

| | | | |
|---|---|---|---|
| 57-122329 | 7/1982 | Japan | G01L 5/00 |
| 63-45528 | 9/1988 | Japan | G01L 3/10 |
| 6-102112 | 9/1992 | Japan | 73/862.331 |
| 7-260601 | 10/1995 | Japan | G01L 3/10 |

*Primary Examiner*—Ronald L. Biegel
*Attorney, Agent, or Firm*—Sughrue, Mion, Zinn, Macpeak & Seas, PLLC

[57] ABSTRACT

In a torque sensor, coils and resistors constitute a bridge circuit, and the mutual connection part of the coils is connected to a power source via a coil drive unit. A control voltage, which varies in the square wave form, is supplied to the gate of a transistor in the coil drive unit so as to vary the voltage supplied to the coils in the square wave form. The output voltages which are the voltages between the coils and the resistors are input to the differential amplifier and the output voltage of the differential amplifier is held by a sample holding circuit to be supplied to a controller as the output voltage. The sample holding circuit holds the output voltage of the differential amplifier when the output voltages between the coils and the resistors are in the transient period. The controller detects the torque based on the output voltage of the sample holding circuit. An abnormal state monitoring unit is provided to detect an abnormal state of the coils.

7 Claims, 13 Drawing Sheets

FIG. 11 (a)
FIG. 11 (b)
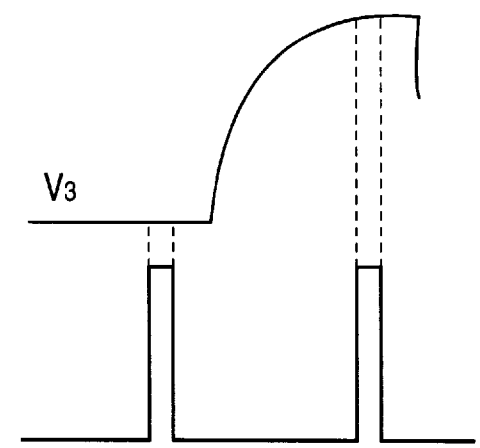
FIG. 12 (a)
FIG. 12 (b)
FIG. 12 (c)
FIG. 12 (d)
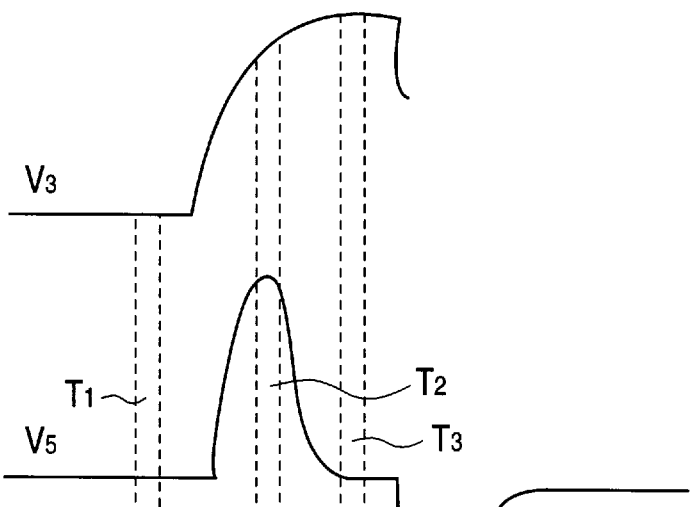

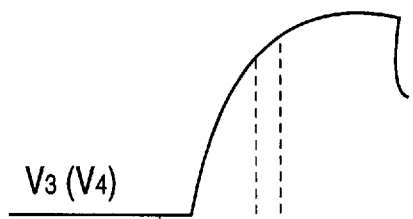
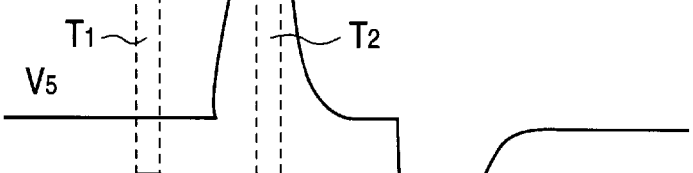
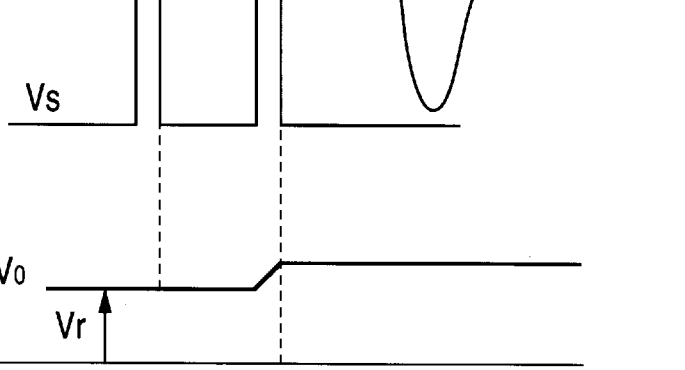
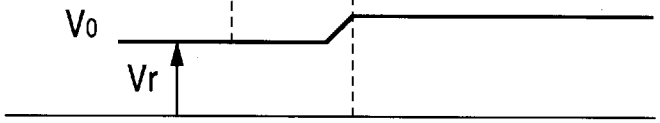
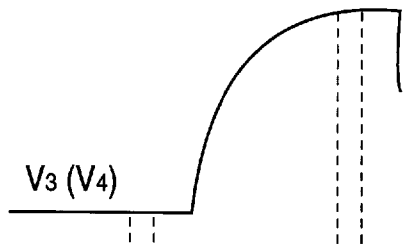

TORQUE SENSOR

BACKGROUND OF THE INVENTION

1. Field of the Invention

The present invention-relates to a torque sensor for detecting torque generated at a rotating shaft, and particularly to a torque sensor, which comprises a coil wherein impedance varies in response to a generated torque. The design provides reduced manufacturing costs and operational benefits, particularly with regard to a reduction in generated heat.

2. Description of the Related Art

A conventional torque sensor is disclosed in Japanese Patent Publication No. Sho 63-45528. In the conventional torque sensor, two cylindrical bodies are fitted coaxially in such a manner as to rotate relatively in response to a torque generated at the shaft. To this end, a long groove and teeth are alternately formed in an axial direction on the outer cylindrical surface of the inner cylindrical body while a cut is formed on the outer cylindrical body in such a manner that the overlap amount may vary according to the relative rotation between the cylindrical bodies. Also, a coil is provided so as to cover the outer cylindrical body. The torque generated on the shaft can be detected through measurement of the impedance of the coil since the impedance of the coil varies when the overlapping amount of the groove and the cut is varied due to a change in the relative rotation position of the two cylindrical bodies.

It is certain that the above-described conventional torque sensor can detect the torque generated at the shaft in response to the variation in the coil impedance. In the above-described conventional torque sensor disclosed in the publication, however, an oscillator for oscillation of accurate sine wave alternating current is needed for a highly accurate torque sensor since the coil is driven by a high-frequency alternating current. This results in high production costs since a large number of electronic parts which respectively require a high accuracy are needed.

Another problem is that since the coil is driven by a sine-wave alternating current whereas the coil is actually driven with application of offset voltages to unify the actual direction of the current (single-side supply power drive), the structure is uneconomical. This is due to an extremely large current consumption and the large current consumption results in the generation of a large amount of heat.

SUMMARY OF THE INVENTION

The present invention has been made to overcome the unsolved problems of the prior art and the object of the invention is to provide a torque sensor that is effective in reducing both costs and generation.

The torque sensor of the present invention comprises: a first and a second rotating shafts that are provided coaxially and connected via a torsion bar while a cylindrical member of an electricity-conductive and non-magnetic material is integrated with the second rotating shaft into a single piece in the rotating direction thereof in such a manner as to cover the outer circumferential surface of the first rotating shaft, at least a covered part of the first rotating shaft covered by the cylindrical member being made of a magnetic material; a groove that is formed on the covered part in such a manner as to extend in the axial direction; windows that are formed in the cylindrical member in such a manner that parts which are overlapped by the grooves may be varied in response to relative rotating positions thereof against the first rotating shaft; a coil that is provided in such a manner as to cover a part of the cylindrical member where the window is formed; and a resistor that is provided serial to the coil, wherein torque that is generated at the first and second rotating shafts, is detected on basis of a transient voltage which is generated between the coil and the resistor when a voltage varying in a square wave is supplied to the coil.

The non-magnetic material in the present invention includes paramagnetic substances and some diamagnetic substances, while the magnetic material includes ferromagnetic substances. The magnetic permeability of the non-magnetic material is similar to that of atmospheric air, which is smaller than the magnetic permeability of the magnetic material.

The transient voltage is a final voltage that is fluctuated by the supply of a voltage that varies in a square-wave state.

Since a voltage that varies in the square-wave state in the present invention drives the coil, the supply intervals of the square-wave voltage need only be synchronized with a sampling clock on the side of a controller, to which the output of the torque sensor is supplied. Consequently, the duration of actual electric current flow through the coil is greatly reduced. The resulting reduction in current consumption will result in a reduction in the amount of generated heat. A highly accurate square wave can be generated much more easily with a smaller number of electronic parts than can a sine wave.

If a sample holding circuit is provided for holding the transient voltage that is generated between the coil and the resistor, torque detection is still possible even if the transient voltage may disappear in an extremely short time.

In addition to the above-described structure, it is desirable to provide an abnormal state-monitoring unit for monitoring an abnormal state. The abnormal state monitoring unit may be a circuit comprising, for example, another sample holding circuit for holding the transient voltage and an upper and lower limit determining circuit for determining whether the output from the sample holding circuit is within or without an appropriate range. With such circuit, the output of the sample holding circuit for torque detection can be forced to zero if the upper and lower limit determining circuit determines that the value is outside such range.

An alternative example of the abnormal state monitoring unit may have a structure wherein the output from the above-described upper and lower limit determining circuit is supplied to the controller as it is so that the presence of an abnormal state is determined at the controller.

Another alternative example of the abnormal state monitoring unit may have a structure wherein, besides the transient voltage between the coil and the resistor, a normal state voltage between the coil and the resistor is held and supplied to the controller. As a result, the presence of the abnormal state is determined on the basis of the difference between the normal state voltage, which is read at the controller, and an appropriate voltage.

Still another alternative example of the abnormal state monitoring unit may have a structure wherein, beside the transient voltage between the coil and the resistor, two normal state voltages before and after the transient voltage are held and supplied to the controller so that the presence of the abnormal state is determined on the basis of the single transient voltage and the two normal state voltages.

BRIEF DESCRIPTION OF THE DRAWINGS

FIGS. 11(a) and 11(b) show the respective waveforms of voltages inside the motor control circuit of the fifth embodiment;

FIGS. 12(a) to 12(d) show the respective waveforms of voltages inside the motor control circuit of the sixth embodiment;

FIGS. 14(a) to 14(d) show the respective wave forms of voltages inside the motor control circuit of the seventh embodiment; and FIGS. 15(a) and 15(b) show the respective waveforms of voltages inside the motor control circuit of the seventh embodiment.

DETAILED DESCRIPTION OF THE INVENTION

Preferred embodiments of the present invention will be described below with references to the drawings.

Figure 1:
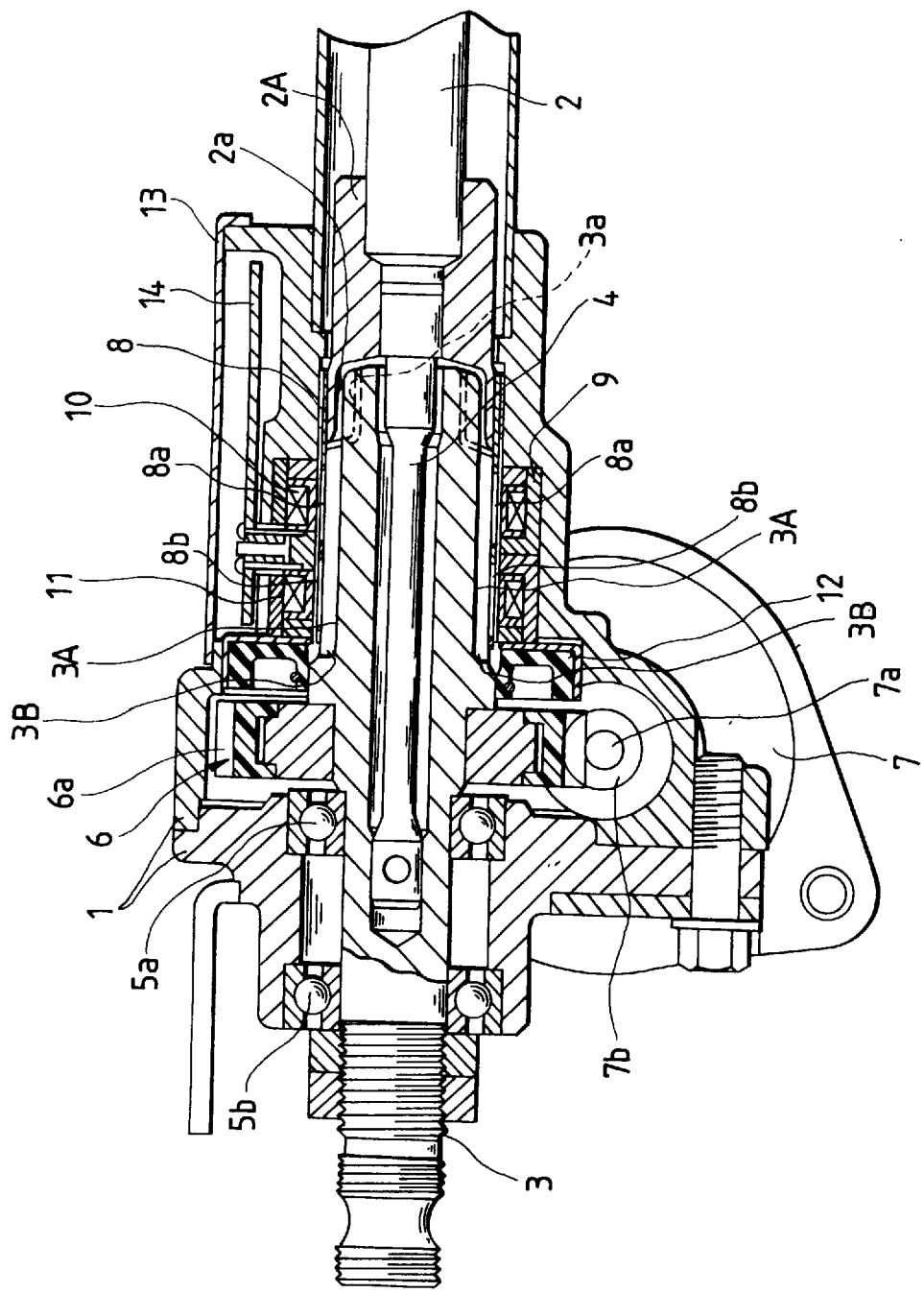
FIG. 1 is a front sectional view of a first embodiment according to the present invention.
Figure 2:
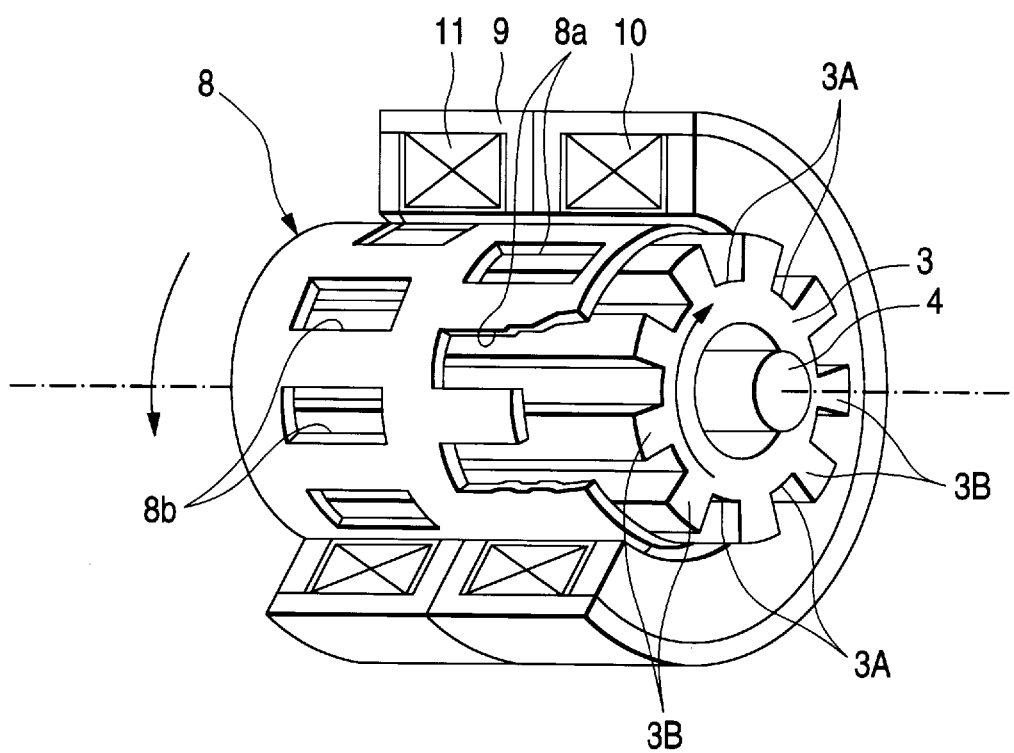
FIG. 2 is a perspective view of a main part of the first embodiment.
Figure 3:
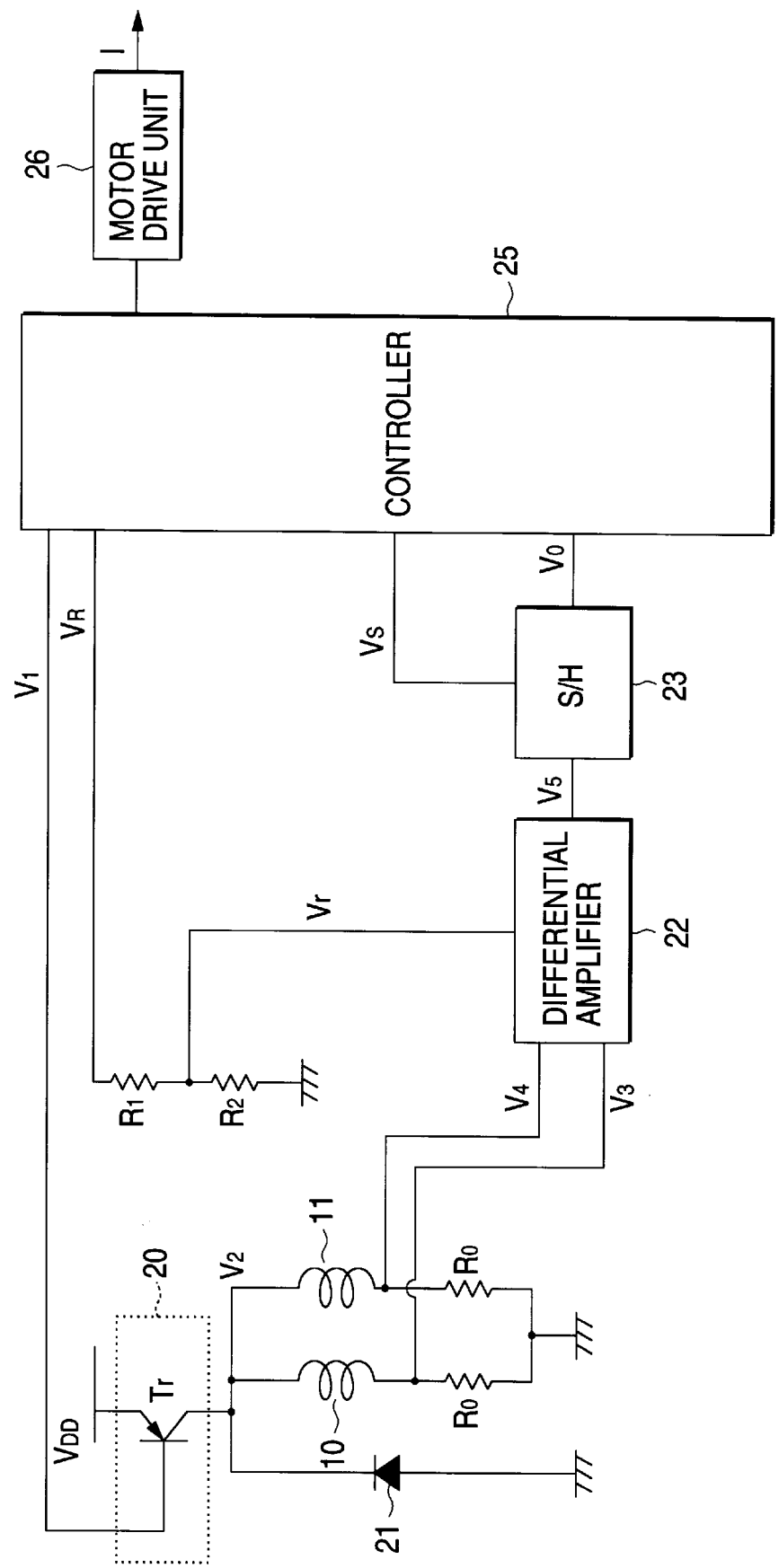
FIG. 3 is a circuit diagram of the motor control circuit of the first embodiment.

FIGS. 1 through 3 show a first embodiment of the present invention, in which a torque sensor of the present invention is applied to an electrically driven power steering apparatus for automobiles.

As shown in FIG. 1 which is a sectional view of the entire power steering apparatus, an input shaft 2 and an output shaft 3 that are connected via a torsion bar 4 are supported by bearings Sa and Sb inside a housing 1 in such a manner as to rotate freely. The input shaft 2, the output shaft 3 and the torsion bar 4 are laid out coaxially and the input shaft 2 and the torsion bar 4 are connected via a sleeve 2A wherewith the end parts thereof are joined by splines while the other end of the torsion bar 4 is joined with the output shaft 3 at a deep position thereof by splines. The input shaft 2 and the output shaft 3 are made of magnetic material such as iron.

A steering wheel is attached on the right end side of the input shaft 2, which is not shown in FIG. 1, integrally in the rotating direction. A pinion shaft which constitutes a generally known rack-and-pinion-type steering apparatus is attached to the left end side of the output shaft 3, which also is not shown in FIG. 1. Therefore, a steering force which is generated when a driver turns a steering wheel is transmitted to vehicle wheels to be steered (which are not shown in the Figure) via the input shaft 2, the torsion bar 4, the output shaft 3 and the rack-and-pinion-type steering apparatus.

The sleeve 2A, which is secured to the end part of the input shaft 2, is long enough to cover the outer circumferential surface of the end of the output shaft 3. A plural number of projections 2a are formed on the inner surface of the sleeve 2A which covers the outer circumferential surface of the end part of the output shaft 3 in the axial direction. A plural number (the same number as the projections 2a) of grooves are formed on the outer circumferential surface of the output shaft 3, which confronts the projections 2a, in the axial direction. The projections 2a and grooves 3a are fitted with backlash mechanism in a circumferential direction thatch prevents relative rotation beyond the predetermined range between the input shaft 2 and the output shaft 3 (for example, approximately ±5 degrees).

A worm wheel 6 which rotates coaxially and integrally with the output shaft 3 is fitted thereon, and resin mesh parts 6a of the worm wheel 6 engages with a worm gear 7b, which is formed on the outer circumferential surface of the output shaft 7a of an electric motor 7. The rotating force of the electric motor 7 is thus transmitted to the output shaft 3 via the output shaft 7a, worm gear 7b and the worm wheel 6, and a steering auxiliary torque in a desired direction is given to the output shaft 3 through appropriate switching between the rotating directions of the electric motor 7.

A cylindrical member 8 of a small thickness is integrally secured on the sleeve 2A, which is integrated with the input shaft 2, in the rotating direction in such a manner as to cover the outer circumferential surface of the output shaft 3 in proximity thereof.

The cylindrical member 8 is formed of an electricity-conductive and non-magnetic material (such as aluminum). As shown in FIG. 2, which is a perspective view of the cylindrical member 8 and the periphery, at such part of the cylindrical member 8 as covers the output shaft 3, a plural number (nine in the present embodiment) of rectangular windows 8a are formed at a regular interval in the circumferential direction on the side close to the sleeve 2A. Also, a plural number (nine in the present embodiment) of rectangular windows 8b (of the same shape as the windows 8a) are formed at a regular interval that deviates from the windows 8a by 180 degrees in the phase in the circumferential direction on the side far from the sleeve 2A.

On the outer circumferential surface of the output shaft 3 that is covered by the cylindrical member 8, a plural number (the same number as the windows 8a and 8b, thus nine in the present embodiment) of semi-rectangular-section grooves 3A are formed in the axial direction.

Specifically, where one cyclic angle 6 (36Θ/N, Θ=40 degrees in this embodiment) is an N (N=9 in this embodiment) division of the circumferential surface of the cylindrical member 8 in the circumferential direction, the windows 8a open at predetermined angles (cyclic angle Θ) from one end of a part of the cylindrical member 8 that is far from the output shaft 3, while the rest of the part is blocked. The windows 8b open periodically at predetermined angles (cyclic angle Θ) from the other end of a part of the cylindrical member 8 that is close to the output shaft 3 in such a manner as to deviate from the windows 8a by half a cycle (Θ/2), while the rest of the part is blocked.

When no torsion is generated on the torsion bar 4 (or when the steering torque is zero), each center part of the width of the windows 8a in the circumferential direction is overlapped by one end part of each of the grooves 3A in the circumferential direction while each center part of the width of the windows 8b in the circumferential direction is overlapped by other end part of each of the grooves 3A in the circumferential direction. Therefore, the overlapping state of the windows 8a and the grooves 3A is the reverse of the overlapping state of the windows 8b and the grooves 3A in the circumferential direction. Moreover, the centers of the windows 8a and 8b in the circumferential direction deviate from the centers of the grooves 3A in the circumferential direction respectively by Θ/4.

The cylindrical member 8 is covered with a yoke around which coils 10 and 11 of the same standard are wound. The coils 10 and 11 are provided coaxially with the cylindrical member 8, wherein the coil 10 is wound around the yoke 9 in such manner as to cover the part wherein the windows Sa are formed. Also, the coil 11 is wound around the yoke 9 in such manner as to cover the part wherein the windows 8b are formed, and the yoke 9 is secured to the housing 1. Inside housing 1 a space that contains the worm wheel 6 is separated by an oil seal 12 from a space that contains the yoke 9, and this structure prevents the lubricant which is supplied to the engagement parts of the worm wheel 6 and the worm 7b from entering the side of the yoke 9.

The coils 10 and 11 are connected to a motor control circuit that is built on a control board 14 inside a sensor case 13.

The motor control circuit comprises, as shown in FIG. 3, two resistors Ro of the same electric resistance, which are connected to the coils 10 and 11 in series. A bridge circuit is formed with the coils 10 and 11 and the resistors Ro.

In the bridge circuit, a mutual connection part between the coils 10 and 11 is connected to the power source VDD via the coil drive unit 20 that consists of a PNP transistor Tr. A mutual connection part between the resistors Ro is connected to ground. The mutual connection part between the coils 10 and 11 is also connected to ground via a diode 21 (known as a flywheel diode), that allows current only when a reverse electromotive force is generated at the coils 10 and 11.

Figure 4:
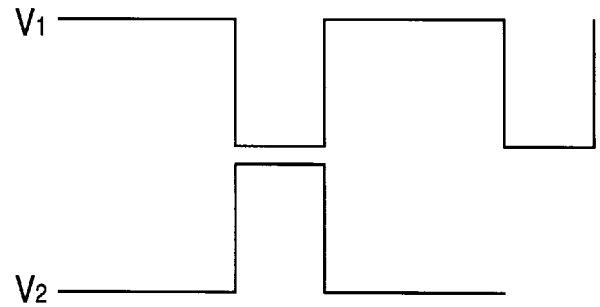
FIGS. 4(a) and 4(b) show waveforms of the voltages supplied from a controller to a coil.
Figure 4:
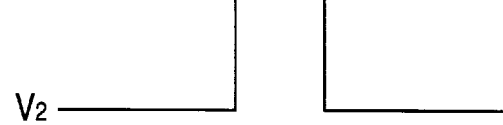

A control voltage $V_1$ is supplied from a controller 25, which comprises a microprocessor and an interface circuit that includes an A/D converter and a D/A converter, which are not shown in the drawing, to the gate of the transistor Tr in the coil drive unit 20. As shown in FIG. 4(a), the control voltage $V_1$ is a voltage that varies in a square wave form, and the output intervals of the square wave form is synchronized by a sampling clock in the controller 25. Since the transistor Tr in the coil drive unit 20 is of a PNP type, the control voltage $V_1$ is a negative logic voltage that falls from a logic value "1" to "0" at the time that the transistor Tr is turned on and that rises from a logic value "0" to "1" at the time that the transistor Tr is turned off.

A voltage $V_2$ which is supplied from the coil drive unit 20 to the coils 10 and 11 varies in a square wave form, as shown in FIG. 4(b), that is synchronized with the on and off states of the transistor Tr. That is, the voltage $V_2$ varies with a waveform that is a reversal of the control voltage $V_1$.

One output voltage $V_3$ of the bridge circuit, which is a voltage between the coil 10 and the resistor Ro, and the other output voltage $V_4$ of the bridge circuit, which is a voltage between the coil 11 and the resistor Ro, are input to a differential amplifier 22. A predetermined neutral voltage Ver, which is generated by dividing a reference voltage Vr that is supplied from the controller 25 with the two resistors $R_1$ and $R_2$ that are connected serially, is also supplied to the differential amplifier 22. The differential amplifier is designed so as to output an output voltage Vs such as expressed in a following formula (1), wherein G expresses an amplifier gain.

$$Vs = G \times (V_3 - V_4) + Vr \qquad (1)$$

For example, where the reference voltage $V_R$ is 5 V and where the resistors $R_1$ and $R_2$ are of an equal electric resistance value, Vr=2.5 V. Thus, the output voltage $V_5$ varies (with 2.5 V as the center thereof) in a range corresponding to the difference between the output voltages $V_3$ and $V_4$.

Figure 5:
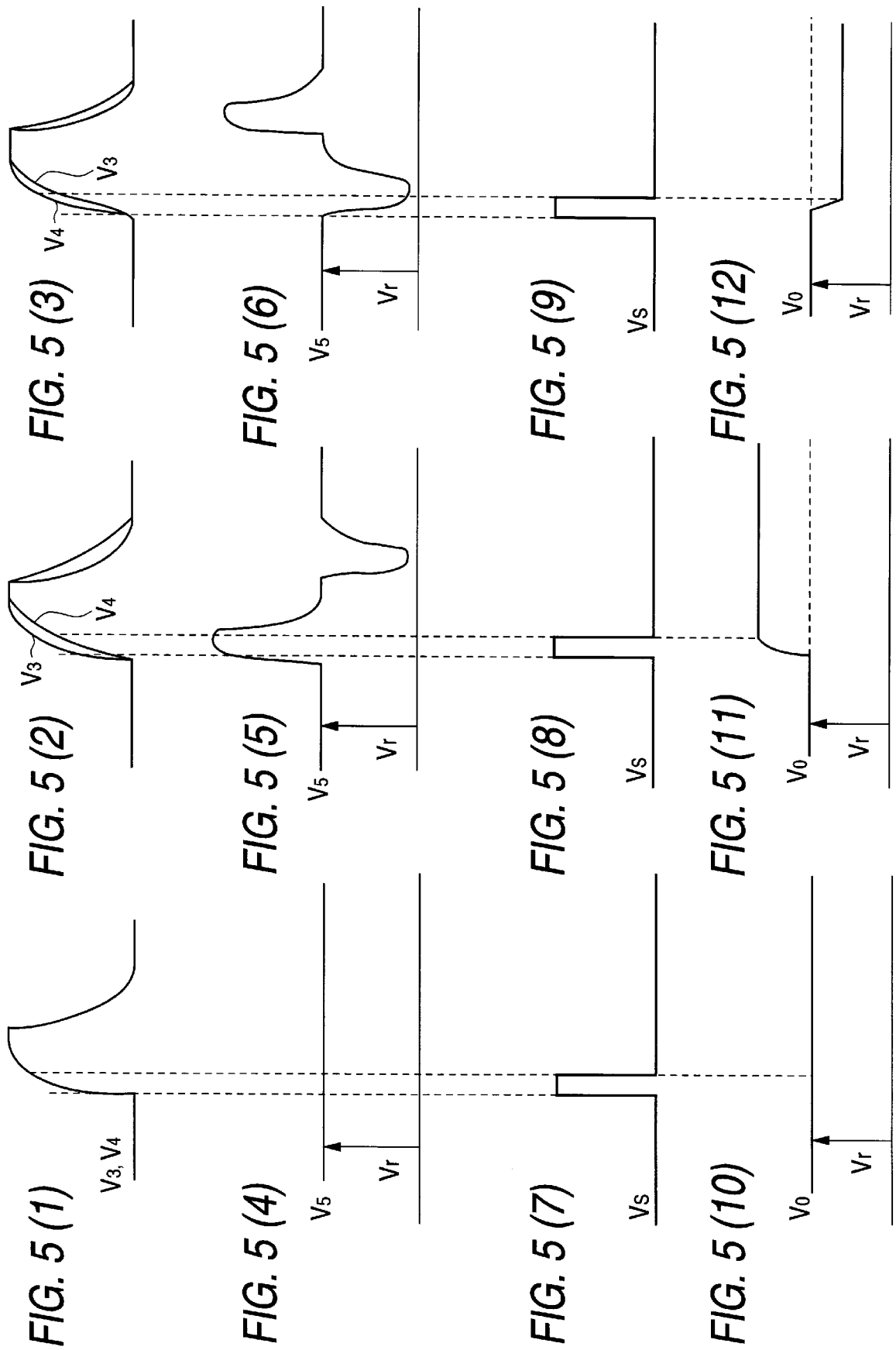
FIGS. 5(1) to 5(12) show the respective waveforms of voltages inside the motor control circuit of the first embodiment.

The output voltage $V_5$ of the differential amplifier 22 is held by the sample holding circuit 23 and supplied to the controller 25 as the output voltage V at a predetermined sampling time. The controller 25 supplies a hold signal Vs, which consists of a short-pulse voltage, as shown in FIG. 5(7), that rises at the same time as a fall of the control voltage V1 and then falls after expiration of a predetermined period of time, to the sample holding circuit 23. The sample holding circuit 23 holds the output voltage $V_5$ at the time of the fall of the hold signal Vs as the output voltage V.

The timing of the fall of the hold signal VS (that is, the pulse wave width as the hold signal $V_5$) exists within the period wherein the output voltages $V_3$ and $V_4$ in the transient state (or varying state) are being supplied to the differential amplifier 22. More specifically, the timing of the fall of the hold signal Vs is at the time of expiration of a time constant τ, which is determined from the inductances of the coils 10 and 11 and the electric resistance value Ro, after the point in time of a fall of the control voltage $V_1$. The time constant τ is utilized for the purpose of holding the output voltage V at a point of time when the difference becomes largest, i.e., there is no difference between the output voltages $V_3$ and $V_4$.

The controller 25 calculates the direction and amount of relative rotation displacement of the input shaft 2 and the cylindrical member 8, based on the output voltage V that is supplied from the sample holding circuit 23. It then multiplies the result by a predetermined proportional constant to obtain a steering torque. The controller generates an output that controls a motor drive unit 26, which is composed of a power transistor and other parts that are not shown in the drawing. The drive unit 26 supplies a driving current I, which generates an auxiliary steering torque that reduces the steering torque based on the result of the calculation, to the motor 7.

A vehicle speed detection signal is supplied to the controller 25 from a vehicle speed sensor, which is not shown in the drawing but acts to determine whether or not the vehicle is being driven at a high speed, based on the vehicle speed detection signal. Since the auxiliary steering torque is determined to be unnecessary during the high-speed drive, the control on the motor drive unit 26 is inhibited. Although not shown in the drawing, a current detection signal for a feedback control of the current in the electric motor 7 is also supplied to the controller 25.

The operation of the first embodiment will next be described.

If the steering system is in a forward driving state while the steering torque is zero, no relative rotation is generated between the input shaft 2 and the output shaft 3. Therefore, there also is no relative rotation between the output shaft 3 and the cylindrical member 8.

When a rotating force is generated in the input shaft 2 through the operation of the steering wheel, the rotating force is transmitted to the output shaft 3 via the torsion bar 4. Since a resistance force, which corresponds to an abrasive force between the vehicle wheels being steered and the road surface, or such an abrasive force as in the engagement between gears in the rack-and-pinion-type steering apparatus which is constructed on the left side (not shown) of the output shaft 3, is generated on the output shaft 3 at this time, a relative rotation that is a delay in the output shaft 3 caused by torsion in the torsion bar is generated between the input shaft 2 and the output shaft 3. Thus, a relative rotation is also generated between the output shaft 3 and the cylindrical member 8.

If there were no windows in the cylindrical member 8, an eddy-current in the direction opposite to the coil current would be generated on the outer circumferential surface of the cylindrical member 8. The current would be generated when an alternating magnetic field is generated by flowing of an alternating current through the coils since the cylindrical member 8 is constructed with an electricity-conductive and non-magnetic material.

If the magnetic field generated by the eddy current and the magnetic field generated by the coils overlap each other, the magnetic field inside the cylindrical member 8 would be nullified.

With provision of the windows 8a and 8b in the cylindrical member 8, the circumferential flow is interrupted by the windows 8a and 8b and thus the eddy current generated on the outer circumferential surface of the cylindrical member 8 forms a loop. Specifically, the current flows around along the end faces of the windows 8a and 8b into the side of the inner circumferential surface of the cylindrical member 8, then flows around the inner circumferential surface in the direction opposite to that of the coil current, and finally return to the side of outer circumferential surface along the end faces of the windows 8a and 8b.

In this state, a loop of eddy current is provided periodically ($\Theta=360/N$) in the circumferential direction inside the coils.

The magnetic fields generated by the coil current and the eddy current are overlapped, and the magnetic fields which alternate periodically in the strength and which have an inclination that the strength is reduced in proportion to the distance to the center, are formed in the circumferential direction both inside and outside of the cylindrical member 8. The magnetic fields in the circumferential direction are strong in the centers of the windows 8a and 8b which are highly influenced by the adjoining eddy currents, and weak at the positions that deviate from the centers by half the cycle ($\Theta/2$).

The shaft 3 of a magnetic material is provided coaxially inside the cylindrical member 8, and grooves 3A and projections 3B are formed on the shaft 3 in the same cycles as the windows 8a and 8b.

A magnetic substance placed in a magnetic field is magnetized and generates a spontaneous magnetism (magnetic flux). The amount of the magnetism grows larger, corresponding to the strength of the magnetic field, until saturated.

The spontaneous magnetism in the shaft 3 is varied by the magnetic field which is created by the cylindrical member 8 and which varies in strength periodically in the circumferential direction and inverse-proportionally in radial direction, corresponding to the phase relative to the cylindrical member 8.

The phase of a maximum spontaneous magnetism is a state wherein the centers of the windows 8a and 8b align with the centers of the projections, and the inductance of the coil varies corresponding to the variation in the spontaneous magnetism. The variation proceeds in an approximate sine wave.

In a state wherein the torque does not have an effect, the phase is deviated by ¼ cycle ($\Theta/4$) from the phase wherein the spontaneous magnetism (inductance) is the largest, and the phases difference between an array of windows close to the sleeve 2A and the other array of the windows is ½ cycle ($\Theta/2$), as described above.

Therefore, if any phase difference is generated by torque between the cylindrical member 8 and the shaft 3, either of the inductances of the two coils 10 and 11 is increased while the other is decreased in the same rate.

If the steering torque is zero with the steering system in a neutral position, the inductances of the coils 10 and 1 are equal. Thus, the self-inductive electromotive forces of the coils 10 and 11 are equal without any difference in the impedances of the coils 10 and 11.

In this state, if, after the control voltage V1 as shown in FIG. 4(a) is supplied from the controller 25 to the coil drive unit 20, the voltage $V_2$ that is a reversal thereof, as shown in FIG. 4(b), is supplied to the coils 10 and 11, the values of the output voltages $V_3$ and $V_4$ of the bridge circuit in the transient state become equal to each other as shown in FIG. 5(1). Then, the output voltage $V_5$ of the differential amplifier 22 is maintained at the neutral voltage Vr as shown in FIG. 5(4), and thus the output voltage V of the sample holding circuit 23 is maintained at the neutral voltage Vr as shown in FIG. 5(10) even with an output of the hold signal Vs as shown in FIG. 5(7).

Consequently, the controller 25 detects that the steering torque of the steering system is zero and, thus, the motor drive unit 26 does not specifically output the drive current I so that an auxiliary steering torque that is unnecessary to the steering system is not generated.

When a rightward steering torque is generated, in comparison with the case wherein the steering torque is zero, the inductance of the coil 10 increases in proportion to the increase in the rightward steering torque while the inductance of the coil 11 decreases. On the contrary, the inductance of the coil 10 decreases in proportion to the increase in the leftward steering torque while the inductance of the coil 11 increases.

When the inductances of the coils 10 and 11 vary as described above, the impedances of the coils 10 and 11 also vary in the same direction and the self-inductive electromotive forces of the coils 10 and 11 also vary in the same direction.

When the rightward steering torque is generated, since the output voltage $V_3$ rises faster than the output voltage $V_4$ as shown in FIG. 5(2), some difference arises between the output voltage $V_3$ and the output voltage $V_4$ at the transient time and the difference is larger when the generated steering torque is larger. On the contrary, when the leftward steering torque is generated, since the output voltage $V_4$ rises faster than the output voltage $V_3$ as shown in FIG. 5(3), some difference arise between the output voltages $V_3$ and $V_4$ at the transient time, and the difference is larger when the generated steering torque is larger.

Therefore, as shown in FIGS. 5(5) and 5(6), the output voltage $V_5$ of the differential amplifier 22 varies to deviate largely from the neutral voltage Vr in compliance with the direction and the intensity of the generated steering torque. The variations in the self-inductance, which is effected by temperatures or the like, are canceled at the differential amplifier.

When the transient time output voltage $V_5$ is held with supply of the hold signal Vs as shown in FIGS. 5(8) and 5(9), the output voltage V that is higher than the neutral voltage Vr is obtained on generation of the rightward steering torque as shown in FIG. 5(11) while the output voltage V that is lower than the neutral voltage Vr is obtained on generation of the rightward steering torque as shown in FIG. 5(12).

The controller 25 obtains the steering torque through multiplying of the difference between the supplied output voltage V and the neutral voltage Vr by a proportional constant and supplies the result to the motor drive unit 26. The motor drive unit 26 supplies the drive current I, which corresponds to the direction and the intensity of the steering torque, to the electric motor-7.

Since a rotating force, corresponding to the direction and intensity of the steering torque being generated, is generated in the electric motor 7 and transmitted to the output shaft 3 via a worm gear or the like, the auxiliary steering torque is applied to the output shaft 3 and the steering torque decreases, resulting in a reduction in labor of the driver.

Even in the structure of the first embodiment wherein the voltage $V_2$ that varies in the square wave is supplied to the coils 10 and 11, since the difference in the transient voltages of the output voltages $V_3$ and $V_4$ are held and supplied to the controller 25 as the output voltage Vo by the differential amplifier 22 and the sample holding circuit 23, the direction and intensity of the steering torque being generated in the steering system can be understood to generate the corresponding auxiliary steering torque.

In the structure wherein the coils 10 and 11 are driven by the voltage $V_2$ which varies in the square wave, the current flows through the coils 10 and 11 only during the time when the voltage $V_2$ has risen. Thus, the current consumption can be reduced greatly if the duty ratio of the waveform of the voltage $V_2$ is sufficiently reduced. All that is necessary to the detection of steering torque in the structure of the first embodiment is that there is an output voltage Vo at the time when a sufficient difference arises between the output voltages $V_3$ and $V_4$ in the transient period,. Thus, the voltage $V_2$ is required to rise only from a fall of the output voltage V1 until expiration of the time constant $\tau$. Therefore, with inclusion of a safety rate, the transistor Tr is needed to be turned on only for the period of time slightly longer than the time constant $\tau$, so that the duty ratio of the voltage $V_2$ may be reduced to be extremely small (for example, reducible to approximately 5%). As a result, since the duration of time when the current flows through the coils 10 and 11 becomes extremely short, the power consumption can be reduced to be economical and the heat generation amount can be also reduced. With the reduction in the heat generation amount, a decrease in the rate of trouble occurrence can be expected.

Since the coils 10 and 11 can be driven by the voltage $V_2$ that varies in the square wave only with a supply of the control voltage V1, that is on-off controlled by the controller 25, to the transistor Tr, the number of required electronic parts is smaller than in the case of the sine wave drive. Thus, the accuracy required for individual electronic parts can be low, and a cost reduction can be expected.

In the first embodiment, the input shaft 2 corresponds to the second rotating shaft and the output shaft 3 corresponds to the first rotating shaft. Also, the projection 3B corresponds to the part that is not a groove and the part of the output shaft 3, which is covered by the cylindrical member 8, corresponds to the covered part.

Figure 6:
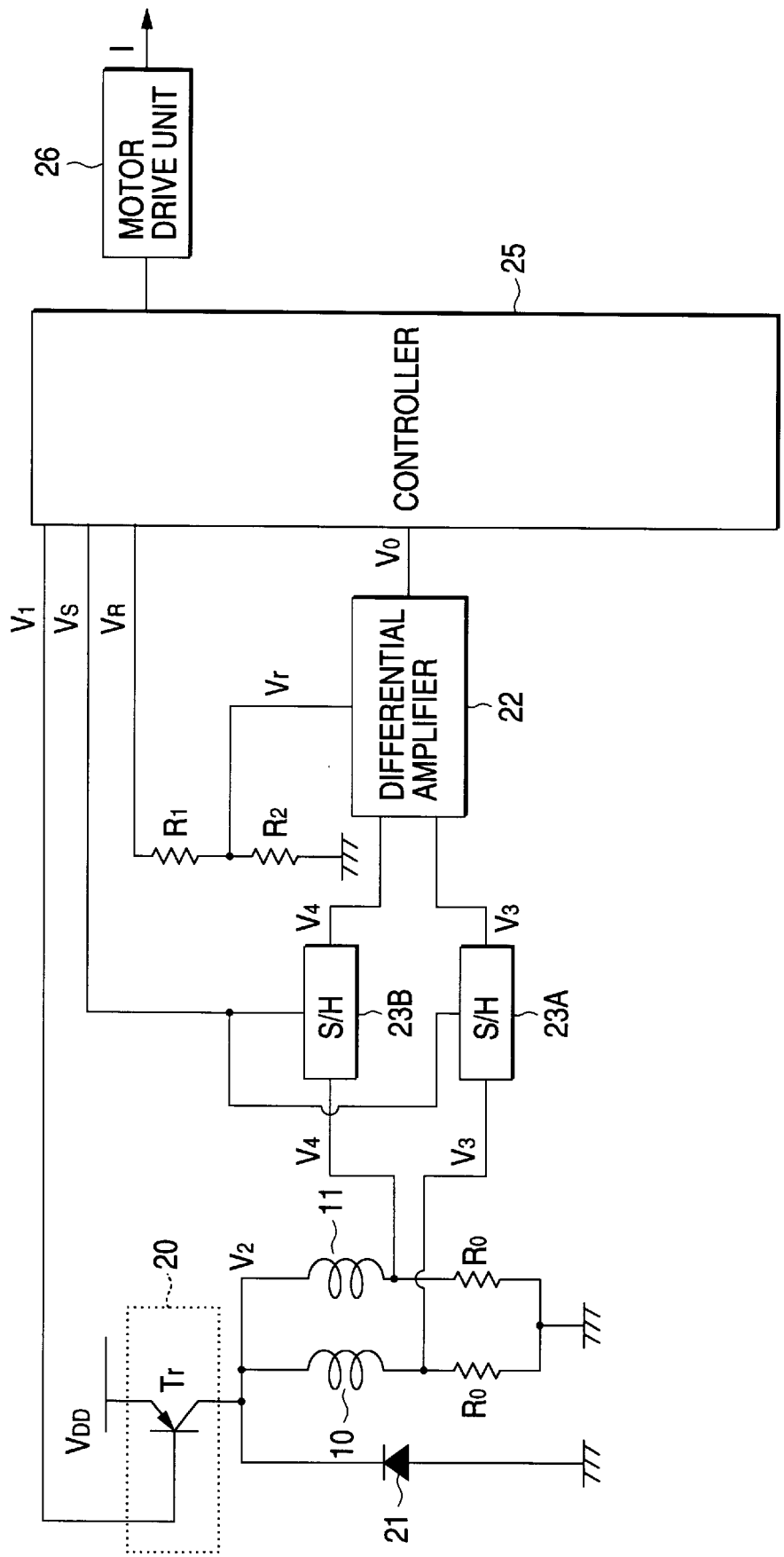
FIG. 6 is a circuit diagram of the motor control circuit of the second embodiment.

FIG. 6 is a circuit diagram to show the configuration of the motor control circuit of the second embodiment of the present invention. Since the whole structure, such as the power steering apparatus, is the same as in the first embodiment described above, the illustrations and descriptions thereof are omitted. The identical symbols are used for the same constituents as in the first embodiment described above in order to eliminate overlapping descriptions.

In the second embodiment, two sample holding circuits 23A and 23B are provided on the prior-stage-side of the differential amplifier 22 and the output voltage $V_3$ is supplied to the sample holding circuit 23A while the output voltage $V_4$ is supplied to the sample holding circuit 23B. The output voltages V3' and V4' of the sample holding circuit 23A and 23B are supplied to the differential amplifier 22 and the output from the differential amplifier 22 is supplied to the controller 25.

Figure 7:
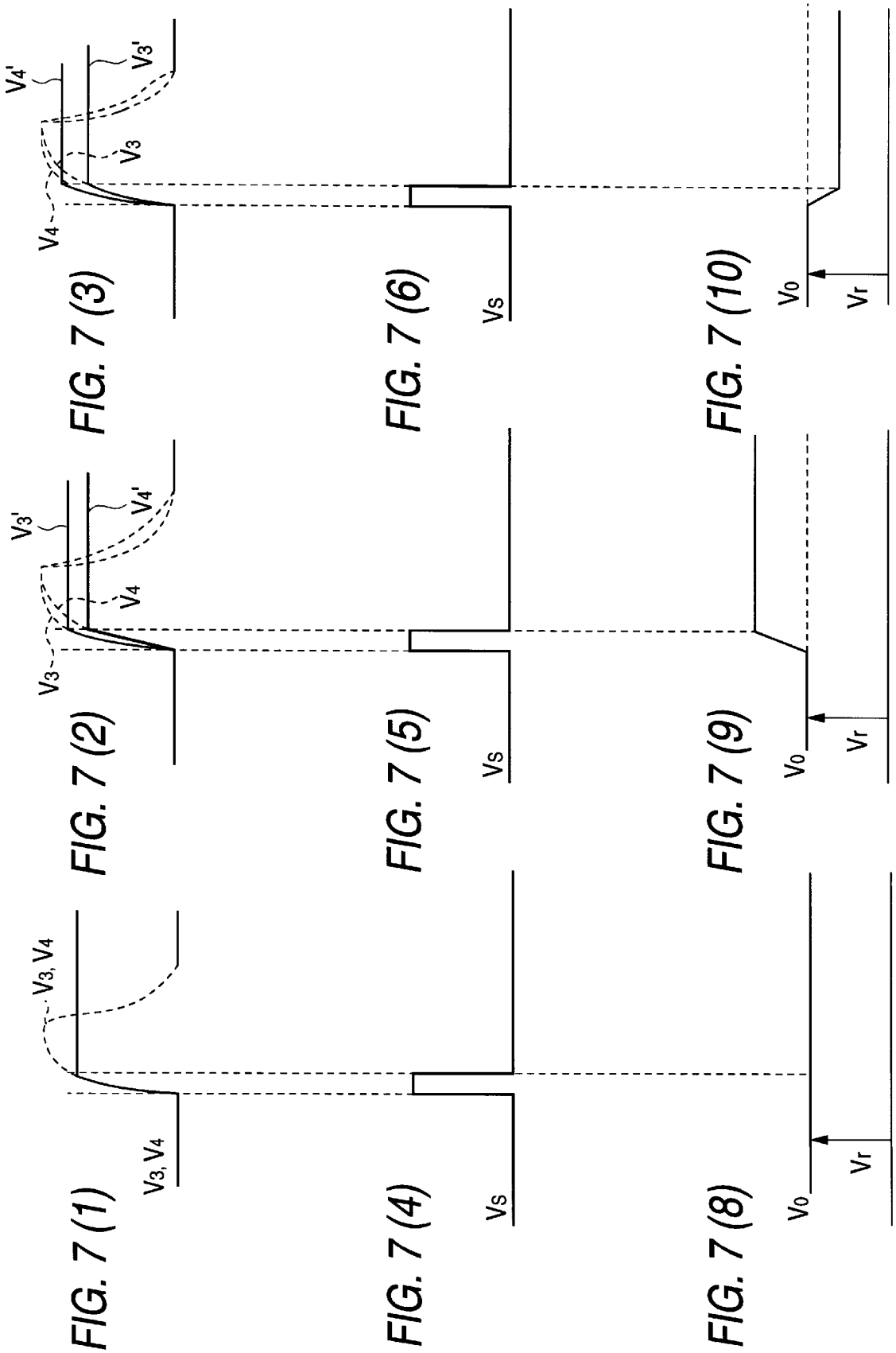
FIGS. 7(1) to 7(10) show the respective waveforms of voltages inside the motor control circuit of the second embodiment.

In the above-described structure, the output voltages $V_3$ and $V_4$ in the transient period are held before differential amplification of the output voltages $V_3$ and $V_4$ as shown in FIGS. 7(1) to 7(3), and the difference between the held output voltages V3' and V4' is amplified by the differential amplifier 22 to output the output voltage V as shown in FIGS. 7(8) to 7(10). Since the sample holding circuits 23A and 23B are provided on the prior-stage-side, this structure is advantageous in that the influence in a case of deviation in the timing of the hold signal VS is decreased.

Figure 8:
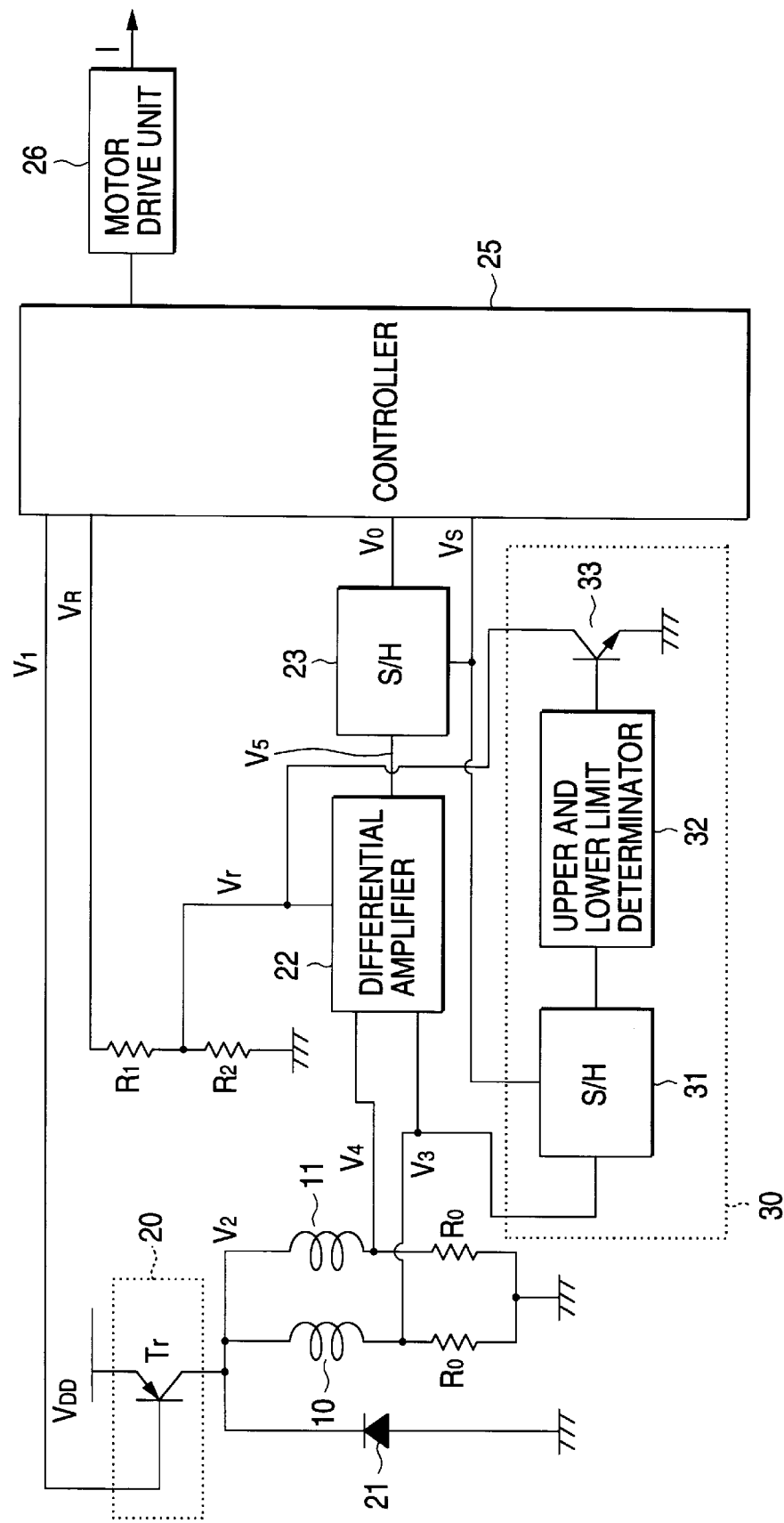
FIG. 8 is a circuit diagram of the motor control circuit of the third embodiment.

FIG. 8 is a circuit diagram to show the configuration of the motor control circuit of the third embodiment of the present invention. Since the whole structure, such as the power steering apparatus, is the same as in the first embodiment described above, the illustrations and descriptions thereof will be omitted. The identical symbols are used for the same constituents as in the first embodiment described above to eliminate overlapped descriptions.

In the third embodiment, except for the provision of an abnormal state monitoring unit 30, the motor control circuit has the same structure as the first embodiment. The abnormal state monitoring unit 30 comprise a sample holding circuit 31 to which an output voltage $V_3$ from the bridge circuit is supplied, an upper and lower limit determining circuit 32 to which the output voltage from the sample holding circuit 31 is supplied, and an NPN-type transistor 33 where the output of the upper and lower limit determining circuit 32 is supplied to the gate thereof. A hold signal $V_5$ is supplied from the controller 25 to the sample holding circuit 31 in the same way as supplied to the sample holding circuit 23. The upper and lower limit determining circuit 32 comprises a window comparator and other components, and supplies to the gate of the transistor 33 such a voltage as turns on the transistor 33 if an instantaneous value of the output voltage $V_3$ which is the output from the sample holding circuit 31 is outside an appropriate range. The emitter of the transistor 33 is connected to the ground side while the collector of the transistor 33 is connected to the side for supply of the neutral voltage Vr of the differential amplifier 22.

In such a structure as described above, if such an abnormal state as a short circuit or a wire breakage occurs in both of the coils 10 and 11, the output voltage $V_3$ become zero or $V_{DD}$ (for example, 5 V) to be held in the sample holding circuit 31 and then supplied to the upper and lower limit determining circuit 32; thus the upper and lower limit determining circuit 32 determines that the output voltage $V_3$ is outside the appropriate range and the transistor 33 is turned on.

Then, since the neutral voltage Vr which is supplied to the differential amplifier 22 is forced to be zero, the output voltage $V_5$ of the differential amplifier 22 become zero, irrelevant to the voltages $V_3$ and $V_4$, and thus the output voltage Vo also become zero. Consequently, since the occurrence of the abnormal state can be recognized on the basis that the output voltage Vo is not within the appropriate range, the control for the generation of the auxiliary steering torque is can be stopped. Thus, the generation of the unnecessary auxiliary steering torque is can be stopped at the time of occurrence of the abnormal state.

If a short circuit or a wire breakage occurs in either of the coils 10 and 11, the difference between the output voltages $V_3$ and $V_4$ becomes extremely large (for example, if the short circuit has occurred in the coil 10, the output voltage $V_3$ becomes $V_{DD}$ while, if the wire breakage has occurred in the coil 10, the output voltage $V_3$ becomes zero). Thus, the output voltage $V_5$ of the differential amplifier 22 becomes the value outside the appropriate range and the output voltage V of the sample holding circuit 23 also becomes the value outside the appropriate range. Consequently, since the occurrence of the abnormal state can be recognized on the basis that the output voltage Vo is not within the appropriate range, the control for the generation of the auxiliary steering torque can be stopped and thus the generation of the unnecessary auxiliary steering torque can be stopped at the time of occurrence of the abnormal state.

In a case of an abnormal state wherein no current flow through the coils 10 and 11 (for such a reason as occurrence of abnormal state in the coil drive unit 20), since both the output voltages $V_3$ and $V_4$ are zero, the output voltage Vs of the differential amplifier 22 and the output voltage Vo of the sample holding circuit 23 become the neutral voltage Vr, and the controller 25 recognizes that the steering torque is zero. Therefore, the auxiliary steering torque, which may act adversely as a load on the driver, will not be generated in such an abnormal state as above.

The structure of the third embodiment as described above is advantageous in that the provision of the abnormal state monitoring unit 30 facilitates the detection of abnormal state in the motor drive circuit of the controller 25 to prevent the generation of the unnecessary auxiliary steering torque in the abnormal state. The other actions and effect are the same as the above-described first embodiment.

Figure 9:
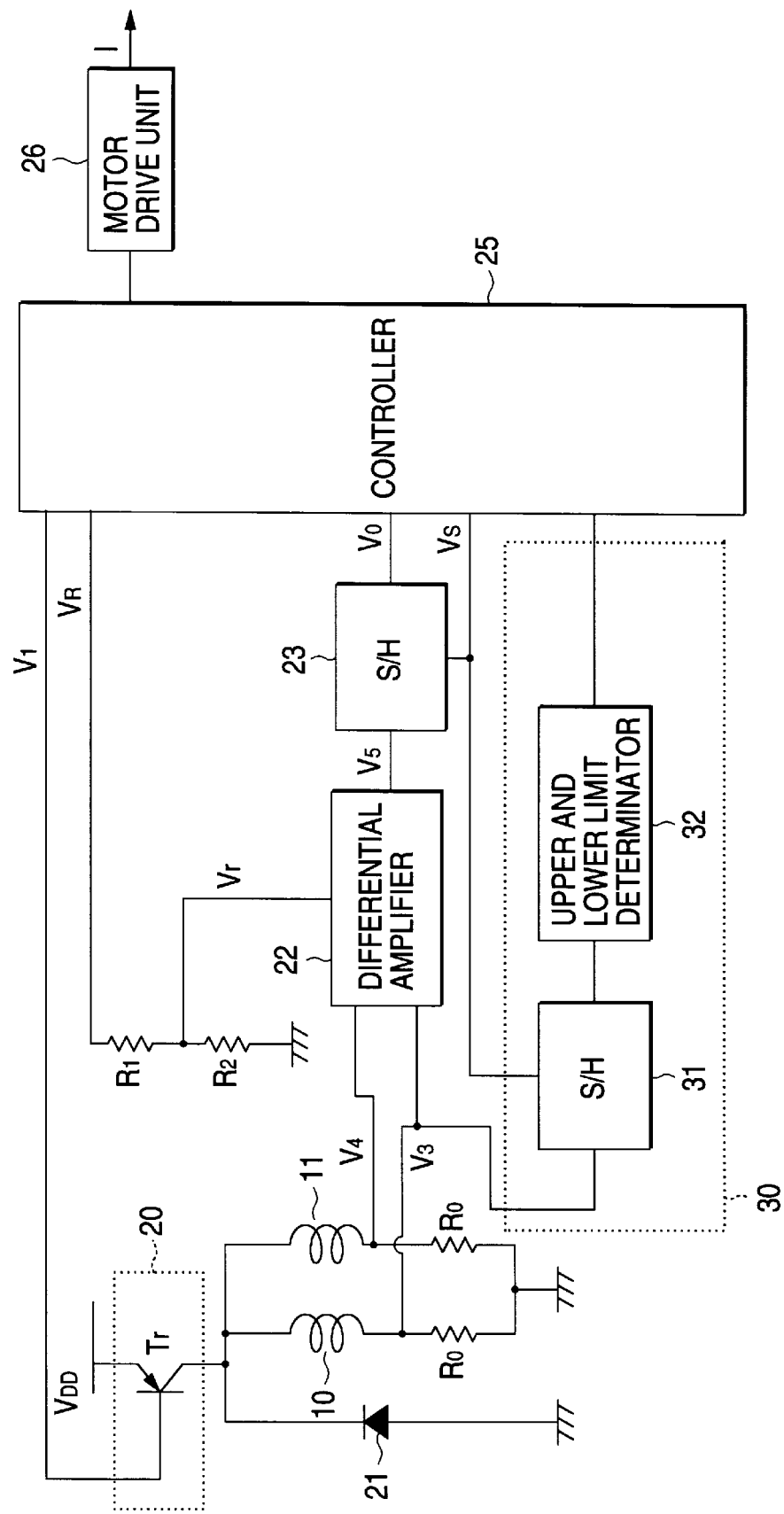
FIG. 9 is a circuit diagram of the motor control circuit of the fourth embodiment.

FIG. 9 is a circuit diagram to show the configuration of the motor control circuit of the fourth embodiment of the present invention. Since the whole structure, such as the power steering apparatus, is the same as in the first embodiment described above, the illustrations and description thereof will be omitted. The identical symbols are used for the same constituents as in the first embodiment describe above to eliminate overlapped descriptions.

In the fourth embodiment, except for the omission of the transistor 33 in the abnormal state monitoring unit 30, the motor control circuit has the same structure as the third embodiment. The output from the upper and lower limit determining circuit 32 in the abnormal state monitoring unit 30 is supplied to the controller 25. In this structure, if such an abnormal state as a short circuit or a wire breakage occurs in both of the coils 10 and 11, the output voltage $V_3$ become zero or $V_{DD}$ to be held in the sample holding circuit 31 and then is supplied to the upper and lower limit determining circuit 32. Thus, the upper and lower limit determining circuit 32 determines that the output voltage $V_3$ is outside the appropriate range and the result is supplied to the controller 25. Consequently, since the controller 25 can recognize the occurrence of the abnormal state, the control for the generation of the auxiliary steering torque is stopped to prevent the generation of the unnecessary auxiliary steering torque at the time of occurrence of the abnormal state. The actions and effects in the case of an occurrence of other abnormal states are the same as the above-described third embodiment, and the other actions and effects are the same as the above-described first embodiment.

In comparison with the above-described third embodiment, the fourth embodiment is advantageous in the omission of the transistor 33.

Figure 10:
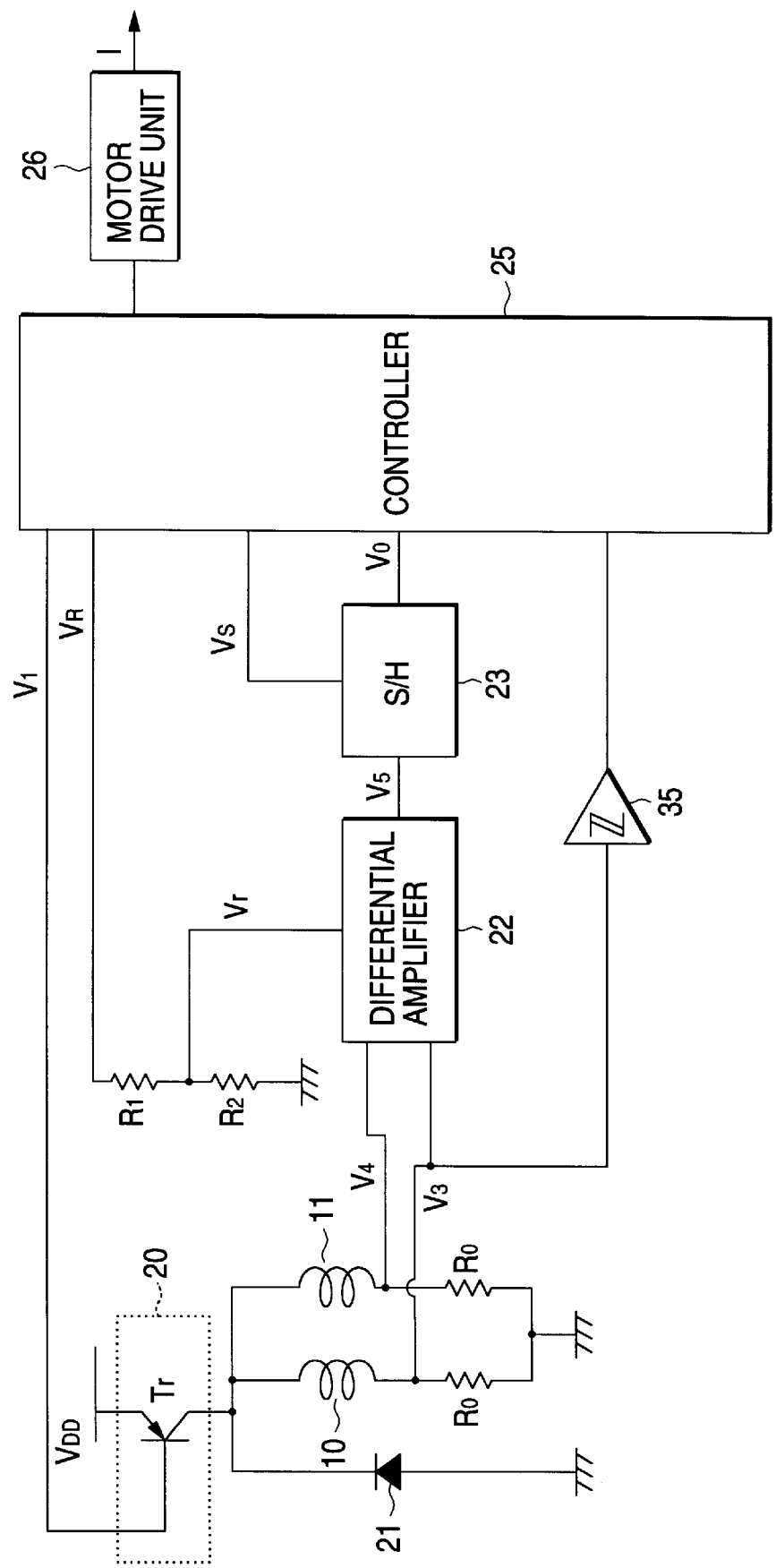
FIG. 10 is a circuit diagram of the motor control circuit of the fifth embodiment.

FIG. 10 are a circuit diagram to show the configuration of the motor control circuit of the fifth embodiment of the present invention. Since the whole structure, such as the power steering apparatus, is the same as in the first embodiment described above, the illustrations and descriptions thereof will be omitted. The identical symbols are used for the same constituents as in the first embodiment described above to eliminate overlapped descriptions.

The structure of the fifth embodiment is the same as the motor control circuit of the first embodiment described above, except for the point that the output voltage $V_3$ from the bridge circuit is supplied to the controller 25 via a level converter 35. The output voltage $V_3$, which varies as shown in FIG. 11(a), is read by the controller 25 at such a timing as shown in FIG. 11 (b). That is, the controller 25 reads the output voltage $V_3$ in the normal state.

In the structure as the fifth embodiment, if such an abnormal state as a short circuit or a wire breakage occurs in both of the coils 10 and 11, the normal state output voltage $V_3$ become zero or $V_{DD}$ and is supplied to the controller 25 via the level converter 35. Thus, the controller 25 can recognize the occurrence of the abnormal state and stop the control for the generation of the auxiliary steering torque in order to prevent the generation of the unnecessary auxiliary steering torque at the time of occurrence of the abnormal state. The actions and effects in the case of occurrence of other abnormal state are the same as the above-described third embodiment and the other actions and effects are the same as the above-described first embodiment.

In comparison with the above-described third and fourth embodiments, the fifth embodiment is advantageous in the simplification of the abnormal state monitoring unit 30.

FIGS. 12(a) to 12(c) illustrate the wave forms of the sixth embodiment of the present invention. Since the structure of the apparatus of the sixth embodiment is the same as the fifth embodiment described above, the illustrations and descriptions thereof will be omitted.

In the sixth embodiment, besides the structure and actions which are the same as those of the above-described fifth embodiment, the output timing of the hold signal VS is additionally set at T1 and T3—in the normal state before and after the transient period T2 of the output voltage $V_5$ of the differential amplifier 22, as shown in FIGS. 12(a) to 12(c). Thus, the output voltage $V_2$ is held three times for each square wave of the voltage $V_2$, as shown in FIG. 12(d), so that the controller 25 can read the output voltage V at each timing.

In the structure as described above, the controller 25 can recognize the output voltage Vo in the three states and determine whether or not the differential amplifier 22 is functioning normally, based on each output voltage V. That is, the auxiliary steering torque control is carried out according to a determination of the direction and intensity of the steering torque being generated, in the same way as the above-described first embodiment, on the basis of the readings of the output voltage Vo which is held at the transient period T2. Moreover, on the other hand, it is possible to determine the occurrence of the abnormal state in the differential amplifier 22 if both readings of the output voltage Vo, which is held at the two normal state timings T1 and T3, are not equally to the neutral voltage Vr. In another case, for example, wherein such an abnormality as defective welding or non-soldering exists in the connection of the coils 10 and 11, since the contact resistance increases and thus the output voltage V which is held at either of the two normal state timings T1 and T3 becomes lower than the neutral voltage Vr, it is possible to determine the connection state of the coils 10 and 11 based on the deviation of the output voltages V thereof from the neutral voltage Vr. In the same actions as the above-described fifth embodiment, it is also possible to detect the occurrence of such an abnormality as short circuit or wire breakage in both of the coils 10 an 11. The actions and effects in the case of other abnormal state are the same as those of the above-described third embodiment, and the other actions and effects are the same as those of the above-described first embodiment.

Figure 13:
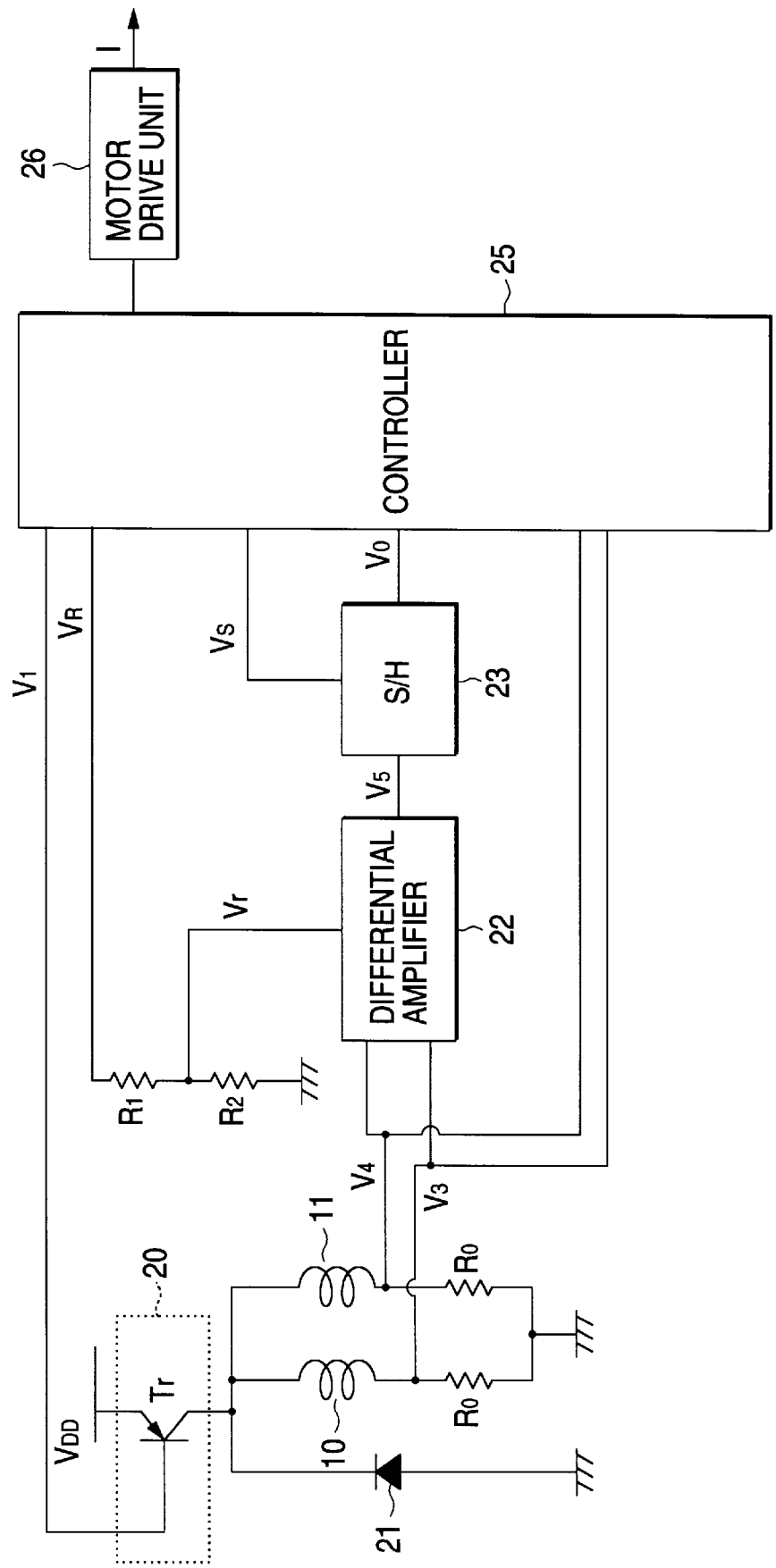
FIG. 13 is a circuit diagram of the motor control circuit of the seventh embodiment.

FIG. 13 is a circuit diagram to show the configuration of the motor control circuit of the seventh embodiment of the present invention. Since the whole structure, such as the power steering apparatus, is the same as in the first embodiment described above, the illustrations and descriptions thereof will be omitted. The identical symbols are used for the same constituents as in the first embodiment describe above to eliminate overlapped descriptions.

The structure of the seventh embodiment is the same as that of the first embodiment described above, except for the point that the output voltages $V_3$ and $V_4$ from the bridge circuit is supplied directly to the controller 25. At least three A/D converters are provided in the controller 25 for respective reading of the output voltages Vo, $V_3$ and $V_4$.

As shown in FIGS. 14(*a*) to 14(*d*), which are views showing wave forms of the seventh embodiment, the output timing of the hold signal Vs is set in the normal state T1 and the transient time T2, and thus the output voltage $V_5$ is held twice for each square wave. As shown in FIGS. 15(*a*) and 15(*b*) the output voltage of the bridge circuit is read at the two normal state timings. FIG. 15(*b*) shows the read timings of the output voltages $V_3$ and $V_4$.

In the structure as above, the controller 25 can recognize whether or not the differential amplifier 22 is functioning and whether the reference voltage Vr is normal, based on the output voltage Vo. It also can recognize an abnormality in the connection part of the coils 10 and 11 and an abnormality in the transistor Tr through a comparison with the value set beforehand at the controller 25, based on the output voltages $V_3$ and $V_4$. The other actions and effects are the same as those of the first and third embodiments described above.

Although the embodiments described above are the cases wherein the torque sensor related to the present invention is applied in the electrically-driven power steering apparatus for automobiles, the application of the present invention is not limited to this.

In the present invention, as described above, since the torque is detected on the basis of the transient voltage which is generated between the coil and the resistor when the voltage that varies in the square wave form is supplied to the coil, the duration of time when the current flows through the coil is extremely shortened to result with reduction in the power consumption so as to be economical and also in the heat generation amount. Moreover, with reduction in the number of necessary electronic parts and decrease in the accuracy required for the individual electronic parts, the costs are effectively reduced.

What is claimed is:

1. A torque sensor comprising;
   a first rotating shaft;
   a second rotating shaft disposed coaxially with said first rotating shaft;
   a torsion bar for connecting said first rotating shaft with said second rotating shaft;
   a cylindrical member of an electricity-conductive and non-magnetic material, said cylindrical member being integrated with said second rotating shaft in a rotating direction of said second rotating shaft so as to cover an outer circumferential surface of said first rotating shaft;
   a covered part of said first rotating shaft which is covered by said cylindrical member, at least said covered part of said first rotating shaft being made of a magnetic material;
   grooves disposed in said covered part in such a manner as to extend in an axial direction;
   windows disposed in said cylindrical member in such a manner that parts of said windows overlapped by said grooves are varied in response to relative rotating positions of said windows against said first rotating shaft;
   coil means disposed so as to cover a part of said cylindrical member where said windows are formed; and
   a control circuit including resistor means which is connected to said coil means in series, said control circuit detecting torque that is generated at said first and second rotating shafts on basis of a transient voltage which is generated between said coil means and said resistor means when a square wave voltage is supplied to said coil means;
   wherein said coil means includes a first coil and a second coil, and said resistor means includes a first resistor connected to said first coil in series and a second resistor connected to said second coil in series, said first and second coils and said first and second resistors forming a bridge circuit; and
   wherein said control circuit includes a coil drive unit for supplying the square wave voltage to said coil means; a differential amplifier connected to a first point between said first coil and said first resistor and to a second point between said second coil and said second resistor; a sample holding circuit connected to said differential amplifier; and a controller connected to said sample holding circuit and to said coil drive unit, said controller calculating the torque.

2. A torque sensor as claimed in claim 1, wherein said control circuit includes an abnormal state monitoring unit for detecting an abnormal state of said coil means.

3. A torque sensor as claimed in claim 2, wherein said abnormal state monitoring unit includes a second sample holding circuit connected to the first point; an upper and lower limit determining circuit connected to said second sample holding circuit; and a switching means connected to said upper and lower limit determining circuit.

4. A torque sensor as claimed in claim 2, wherein said abnormal state monitoring unit includes a second sample holding circuit connected to the first point, and an upper and lower limit determining circuit connected to said second sample holding circuit and to said controller.

5. A torque sensor as claimed in claim 2, wherein said abnormal state monitoring unit includes a level converter connected to the first point and to said controller.

6. A torque sensor as claimed in claim 1, wherein said controller includes at least three A/D converters and is connected to the first point.

7. A torque sensor comprising:
   a first rotating shaft;
   a second rotating shaft disposed coaxially with said first rotating shaft;
   a torsion bar for connecting said first rotating shaft with said second rotating shaft;
   a cylindrical member of an electricity-conductive and non-magnetic material, said cylindrical member being integrated with said second rotating shaft in a rotating direction of said second rotating shaft so as to cover an outer circumferential surface of said first rotating shaft;

a covered part of said first rotating shaft which is covered by said cylindrical member, at least said covered part of said first rotating shaft being made of a magnetic material;

grooves disposed in said covered part in such a manner as to extend in an axial direction;

windows disposed in said cylindrical member in such a manner that parts of said windows overlapped by said grooves are varied in response to relative rotating positions of said windows against said first rotating shaft;

coil means disposed so as to cover a part of said cylindrical member where said windows are formed; and a control circuit including resistor means which is connected to said coil means in series, said control circuit detecting torque that is generated at said first and second rotating shafts on basis of a transient voltage which is generated between said coil means and said resistor means when a square wave voltage is supplied to said coil means;

wherein said coil means includes a first coil and a second coil, and said resistor means includes a first resistor connected to said first coil in series and a second resistor connected to said second coil in series, said first and second coils and said first and second resistors forming a bridge circuit; and wherein said control circuit includes a coil drive unit for supplying the square wave voltage to said coil means; a first sample holding circuit connected to a first point between said first coil and said first resistor; a second sample holding circuit connected to a second point between said second coil and said second resistor; a differential amplifier connected to said first and second sample holding circuits; and a controller connected to said differential amplifier and to said drive unit, said controller calculating the torque.

* * * * *